2,902,644

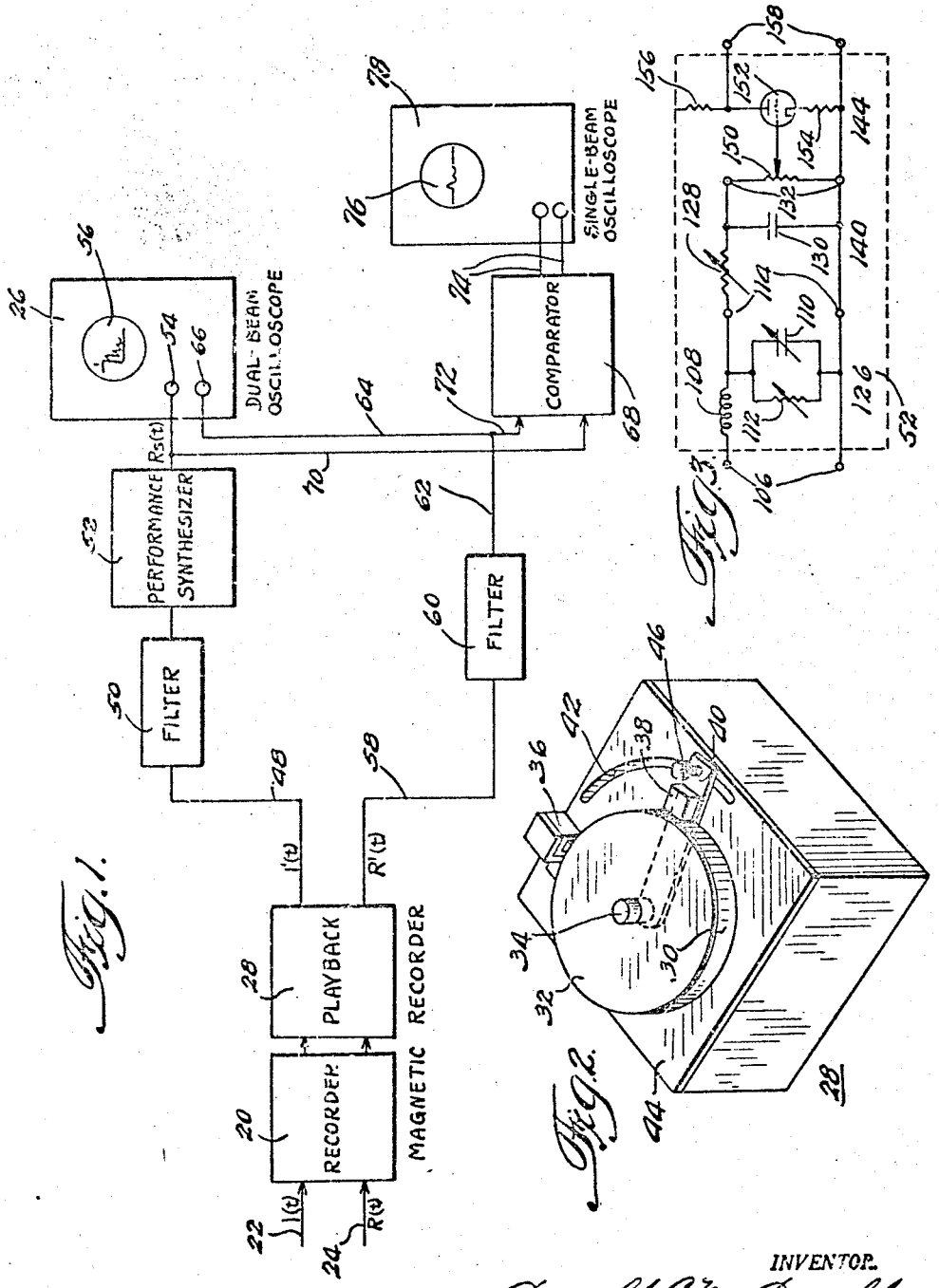

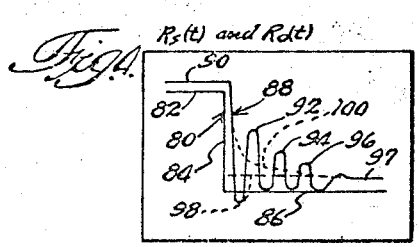
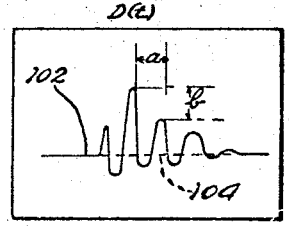
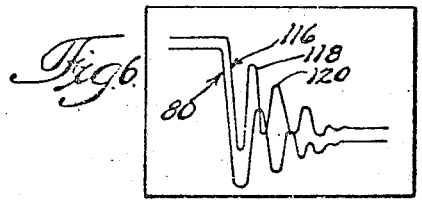
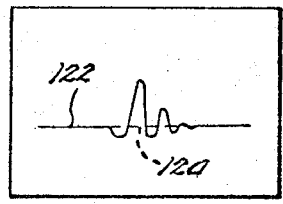
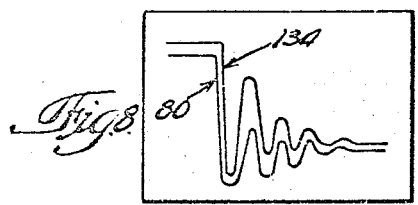
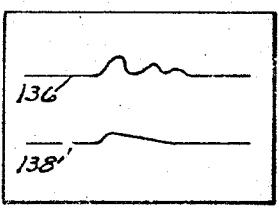
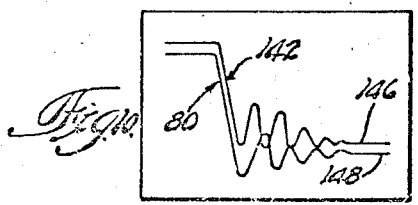
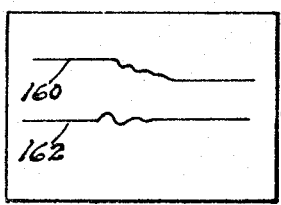
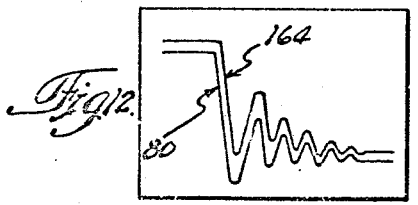
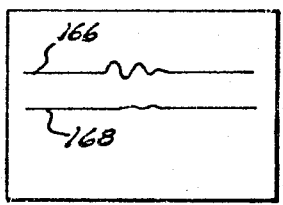
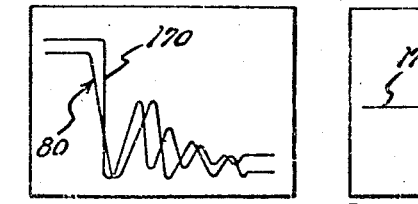
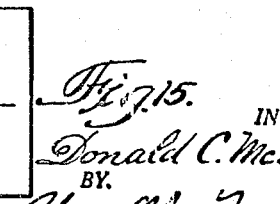

TRANSFER FUNCTION ANALYSIS

Donald C. McDonald, Wellesley, Mass., assignor, by mesne assignments, to Cook Electric Company, Chicago, Ill., a corporation of Delaware Application November 10, 1953, Serial No. 391,270

16 Claims. (Cl. 324—57)

This invention relates to an improved method and apparatus for the analysis of complex relationships, and more particularly to the analysis and synthesis of equivalents for particular control systems.

It is a particular object of this invention to provide an improved method and apparatus for the analysis of the relationship between a cause and a corresponding result.

It is a further object of this invention to provide an improved method and apparatus for obtaining from a representation of the response to an arbitrary input, the transfer function of a complete system or any section of such a system in either a factored operational form or a frequency or time response form.

Upon the application of a signal to any control device it will produce an effect at its output that bears a determinable relationship to the input signal. For example, when a pilot applies a force to a rudder pedal in an aircraft, a predetermined yaw angle is established in the aircraft's flight. Furthermore, the magnitude and speed of the rudder deflection will be reflected in the degree and rate of change of the yaw angle. In the proper design of control systems it is essential that the relationship of the output response to various inputs be considered. Control systems generally exhibit both a periodic response and a transient response to an arbitrary input. By determining the exact nature of these responses a mathematical representation may be derived for the system which is defined as the system's transfer function. Through a knowledge of the transfer function a designer may provide rigidity or resiliency in the system as is necessary to overcome certain natural resonances which may exist and may further incorporate certain electronic or mechanical elements in the system under test to compensate for known periodic or transient effects. Furthermore, through a knowledge of the resonant character of a particular electrical or mechanical system appropriate damping may be included to diminish any detrimental effects which would otherwise be produced.

Several devices have been proposed heretofore for the analysis of systems and the determination of transfer functions. These have generally been cumbersome and complex and therefore unsatisfactory for use in a flying aircraft or under similar conditions which require equipment of minimum size and weight and high accuracy. Furthermore the analyzers heretofore proposed have generally required the application of certain known inputs to a system under test whereby the response of the output to said known inputs may be observed. While for certain systems this technique of analysis is satisfactory, many systems suffer structural damage as a result of the application of periodic signals to the input as required in the test procedure.

In particular many systems heretofore proposed have utilized a harmonic analysis of the system wherein sine wave inputs of varying frequency are applied thereto and the transfer function ascertained by measurement of the output response to the varying sine inputs. The transformer function is then expressed as a Fourier series; that is, a harmonic series or integral representative of the system response. A Fourier series or integral is useful under certain conditions where response to periodic inputs is the prime consideration. However, it is substantially impossible to utilize a transfer function in the Fourier form for the determination of transient response of a system. Furthermore, harmonic analysis by Fourier series requires the use of known predetermined inputs of a periodic nature and is impractical for use where only arbitrary inputs are available, or, in other words, where resort to difficult and complex mathematical computations would be required.

It is therefore a further object of this invention to provide a system for transfer function analysis adapted for use with arbitrary inputs.

It is a further object of this invention to provide an analyzer and method of analysis which will produce a transfer function in a simple and useful form for either frequency response or transient response studies.

It is still another object of this invention to produce an analog synthesis of any known electrical or mechanical system whereby laboratory studies may be made for the purpose of compensating or modifying the system response.

It is still another object of this invention to provide a transfer function analyzer which may be utilized under actual operating conditions of the system under test and to provide a method of analysis which may utilize input and response data accumulated under actual operating conditions.

It is an additional object of this invention to provide an improved method and apparatus whereby a transfer function or response function may be represented as the sum of individual exponentially-damped sinusoids and exponentials.

Further and additional objects of this invention will become manifest from a consideration of this description, the accompanying drawings, and the appended claims.

In one form of this invention, an analyzer is provided which is adapted to make a record on a magnetic medium which represents in one channel the input signal and, in an adjacent channel a signal representing the response of the system under test. The adjacent channels are subsequently reproduced through a playback system to produce an electrical signal representing the input and a second electrical signal representing the response of the system. The electrical signal representing the response may be directly applied to one set of vertical plates of a dual beam oscilloscope after appropriate amplification. Similarly, the signal representing the system input may be applied to a second set of vertical plates in such dual beam oscilloscope, and the relationship between the two traces on the scope may be observed.

After observing the characteristics of the input and response signals it will be mainifest to a person skilled in the operation of this apparatus that certain characteristics have been imparted to the response signal which are not present in the input signal, and these characteristics represent the transfer function of the system under test. Most electrical and mechanical systems will exhibit several predetermined transfer characteristics which may readily be isolated and identified. By inserting in the input channel of the analyzer electrical networks representing these identified transfer characteristics, and input and output traces on the dual beam oscilloscope may be made to have similar configurations. Generally the transfer function of a system will include a resonant response characteristic which will cause a periodic variation in the system response and will also include a transient time delay which will be of a generally exponential form. A damped periodic response may be synthesized in the input channel by the use of an oscillatory circuit such as a familiar RLC circuit, and the exponential characteristic may be added to the input signal by the inclusion of a network comprising a series resistance and capacitance, the output being taken across the capacitance in the well-known manner. The aforementioned networks comprise a synthesizer for producing an electrical analog of the performance characteristics of the system undergoing tests. Hereinafter, the unit comprised of these networks will be called a performance synthesizer.

For a more accurate determination of the transfer function, the input signal, altered by the performance synthesizer, and the response signal, are applied to a comparator network which produces an output signal representing the difference between the signals. This difference signal, when applied to a single beam oscilloscope, will produce a single trace representative of the unsimulated portions of the transfer function. By producing a straight line trace on the single beam oscilloscope by the use of appropriate networks, a complete representation of the transfer function may be produced in analog form in the synthesizer. From the parameters used in these networks an equation may be derived which will be completely representative of the system under test and may be utilized in further design operations or in response compensation.

For a more complete understanding of this invention reference should be made to the accompanying drawings, wherein Fig. 1 is a block diagram of one apparatus which may be utilized in performing the method of transfer function analysis taught by this invention;

Fig. 2 is a diagrammatic view of one magnetic tape playback device which may be utilized in the embodiment of Fig. 1;

Fig. 3 illustrates schematically one network which may be employed in the performance synthesizer of Fig. 1;

Fig. 4 is illustrative of the display which will be produced on the dual beam oscilloscope of Fig. 1 for a typical system under test subjected to a step input;

Fig. 5 illustrates the single trace representative of the difference between input and response for the system shown in Fig. 4; and Figs. 6–15 represent the dual beam and single beam representations for varying degrees of periodic and transient compensation in the input signal, as will be described in detail hereinafter.

Referring now to the drawings, and more particularly to Fig. 1, a recorder 20 is illustrated, for producing a magnetic tape record of an input signal diagrammatically indicated as arrow 22 and a response signal indicated as arrow 24. These signals, as described above, may be electrical analogs representative of any phenomenon. As suggested above, the input signal may be a voltage proportional to rudder deflection in an aircraft and the response signal, a voltage proportional to the response of the aircraft, namely, the angular change in direction of the longitudinal axis of said aircraft generally defined as yaw angle. The recorder 20 is the only portion of this apparatus which must be in operation at the time the actual tests are being made upon a system. The remainder of the apparatus of Fig. 1 may be maintained in a laboratory where the analysis of the system under test may be performed under ideal laboratory conditions at a time convenient for such analysis. A magnetic tape may be produced by the recorder 20 representative of a series of operations such as a series of aircraft manipulations, which may represent either inputs of a completely arbitrary nature or of known mathematic characteristics for which a functional representation is available. However, as the analyzer herein described eliminates the input signal or function from the ultimate analysis the exact nature of said input is of negligible consequence. For illustrative purposes, however, the description hereinafter will assume a step input, that is a substantially instantaneous change of position which in turn produces a substantially instantaneous change of voltage at the input to the recorder 20 to produce a step function in the input signal trace on the dual beam oscilloscope 26.

The playback device 28 may be of any conventional type adapted for use with two adjacent intelligence channels. One such reproducer is diagrammatically shown in Fig. 2. Therein a tape record 30 is peripherally mounted on a nonmagnetic drum 32 and rotated on the drum's spindle 34 at a determinable speed. In many applications the drum speed during playback will produce a tape speed identical to that employed in recording. Under such conditions the playback device produces a signal on a real time base. However, some systems will have resonant characteristics and transient responses such that a real time base would produce such slow repetition rates that accurate reproduction by the playback 28 which employs amplifiers with capacitive couplings would be impossible. Therefore, for accurate reproduction and manipulation of the response signal it is found desirable that the repetition rate of the response characteristic be at least fifteen times per second. Thus if the transient period is longer than 0.7 second it is desirable to accelerate the tape speed whereby an artificial time base is employed to provide a repetition rate which is within the response range of the amplifying equipment. A fixed pickup head 36 is mounted adjacent to the periphery of drum 32 and is adapted to sense the magnetic record in one of the two channels, preferably the input channel. A second pickup head 38 is mounted on a radially extending arm 40 which is pivotally mounted at the axis of drum 32. A groove 42 is provided in the base 44 of the playback 28, and this groove is engaged by a locking thumb screw 46. Thus the head 38 may be rotated to any desired position relative to the fixed head 36 and secured in such a position by tightening thumb screw 46 to engage the slot 42. Generally during initial transient analysis the angular displacement of movable head 38 with respect to fixed head 36 will be the same as the angular displacement employed during recording of the two channels. However, as will be explained in more detail, certain transfer functions will produce a phase shift in the response signal, and analysis of the response is greatly facilitated by compensating for this phase shift by moving the head 38 relative to the fixed head 36. Thus the apparatus just described constitutes a mechanical expedient for producing a desired electrical phase shift.

Referring again to Fig. 1, the output signal from fixed head 36 (Fig. 2), representing the input to the system under test, is applied through conductor 48 to filter network 50 and, in turn, to a performance synthesizer 52. The output of the performance synthesizer 52 is applied to terminal 54 on the dual beam oscilloscope 26, said terminal comprising the input to one set of vertical deflection plates in the cathode ray tube 56. Initially the filter 50 and performance synthesizer 52 effectively will be shorted or removed from the circuit, whereby the output from playback 28 will be applied directly to the terminal 54.

In a similar manner the signal generated in head 38 (Fig. 2) from the magnetic record in the response channel of tape 30 (Fig. 2) will be applied through conductor 58 to a filter network 60 which is identical to the filter network 50. The output of filter 60 is applied through conductors 62 and 64 to terminal 66 of the oscilloscope 26 which is connected to a second set of vertical deflection plates in the cathode ray tube 56. No explanation of the construction or operation of the cathode ray oscilloscope is believed necessary as this is well understood in the art. The oscilloscope 26 will be adjusted to have a horizontal sweep substantially equal to the repetition rate of the electrical signals corresponding to the input and response of the system under test. A signal may also be applied from the playback 28 to a synchronizing input on the oscilloscope 26 whereby the horizontal sweep rate will be synchronized and maintained substantially at the desired rate, namely the repetition rate of the signal on the magnetic drum. The vertical amplitude adjustments on the oscilloscope 26 should be present in such a manner that the traces will exhibit equal amplitudes when equal voltages are applied to the terminals 54 and 66. The intensity control on the oscilloscope 26 should be adjusted to give a persistent display on the cathode ray tube 66. The remaining controls on the cathode ray tube, such as focus, horizontal gain, spot shape, etc., should be adjusted in the conventional manner.

In addition to the display on the dual beam oscilloscope 26, a more accurate comparison of the input and response signals may be effected by applying the output of performance synthesizer 52 to a comparator 68 through conductor 70 and coincidently applying the output of playback head 38 (Fig. 2) representing the response signal to comparator 68 through conductors 62 and 72. The comparator 68 may be any conventional device adapted to take a difference between two voltage signals and provide a voltage output representing this difference. One convenient manner of taking this differential is to provide a pair of serially connected resistors with the common connection grounded and applying the two inputs to the free terminals of these resistors. The output taken at the free ends of said resistors will then represent the difference between the incoming signals. If the signals are of equal magnitude and the same polarity it is believed clear that both resistor terminals will be at the same potential above ground, and therefore the potential between these terminals will be zero. This output is applied through conductors 74 to the vertical deflection plates of a cathode ray tube 76 in a signal beam oscilloscope 78. Again the horizontal signal driving the trace should be approximately the same as the repetition rate of the input and response signals. A signal is preferably applied to the synchronizing input of the oscilloscope 78 from either the input or response channels whereby synchronous operation is insured. This is a common expedient and is not illustrated in Fig. 1.

One particular dual beam display is illustrated in Fig. 4, and the corresponding single beam display is shown in Fig. 5. In Fig. 4 the lower trace 80 represents the input signal to the system under test showing steady-state operation of the system during the time represented by portion 82 of the trace, an input displacement shown by the substantially instantaneous step 84 in the trace, and the subsequent steady-state horizontal trace 86. The response signal corresponding to the step input illustrated by trace 80 is defined by the upper trace 88 of Fig. 4. The trace 88 shows a period of steady-state operation represented by the horizontal portion 90, a complex response to the instantaneous input step 84 which comprises a wave form including a transient and a damped periodic response having nodes or peaks 92, 94, and 96, and a steady-state tail 97, indicating the transient phenomena have damped out to a negligible value. Thus the trace 88 is illustrative of a combination of the input step function and the response function of the system and may become a rather complex wave form difficult of visual analysis.

However, by taking the difference between the input signal 80 and the response 88 a single trace 102 may be produced as illustrated in Fig. 5. The trace 102 is typical of the display produced in the single beam oscilloscope 78 when energized from the comparator 68 of Fig. 1. This single trace is representative of the response function or transfer function of the system under test, and if of a simple nature may readily be identified as a combination of certain periodic and transient phenomena, as will be described in greater detail. A visual inspection of trace 102 reveals to a skilled operator first, that a periodic response function is present having a repetition rate "$a$" which bears a known relationship to $W_o$, the natural frequency, and a damping characteristic determined by the difference "$b$" between successive nodes from which the damping coefficient "$c$" may be determined. Furthermore it is apparent from inspection that the trace is not symmetrical about the imaginary axis 104 but is disposed substantially above this axis. This indicates to an operator that the transfer function of the system under test includes an exponential or transient term. Thus the major factors in the transfer function of the system under test have been identified and some indication of the magnitude thereof is available.

For a more complete and accurate analysis of the complete transfer function it is desirable that electrical networks be inserted in series with the output of the playback which corresponds to the input to the system under test. The networks which comprise the performance synthesizer 52 in Fig. 1 will generate electrical signals which are analogs of various mechanical phenomena which occur in most actual structures. One possible network which may be utilized as a performance synthesizer is illustrated in Fig. 3. Therein the input terminals 106 represent the input terminals to the performance synthesizer 52, and a signal is applied thereto representing the input to the system under test. The input signal is applied to the series arrangement of an oscillating network 126, an integrating network 140, and an amplifier 144. Each successive network must present a relatively high impedance to the preceding stages to minimize interference therebetween.

Connected between the terminals 106 is an inductance 108 connected in series with the parallel combination of an adjustable capacitance 110 and an adjustable resistor 112. The inductance 108 and series capacitance 110 constitute a series resonant circuit, and thus the application of a pulse or other voltage signal at the terminal 106 will cause the resonant circuit to oscillate at a natural frequency determined by the magnitudes of the components. The resistor 112 provides damping for the resonant circuit, and the magnitude of resistor 112 will determine the coefficient of damping of said circuit. Thus if a step function such as illustrated by trace 80 of Fig. 4 is applied to the terminals 106, the network above described will produce oscillations whereby the signal appearing at output terminals 114 will appear as illustrated by trace 116 of Fig. 6. The repetition rate of the trace 116 as indicated by the distance between successive peaks 118 and 120 is determined by the adjustment of capacitor 110, and the damping rate by resistor 112.

As illustrated in Fig. 6, the modified input trace 116 has a repetition rate somewhat greater than the repetition rate of the response signal 80 as may be determined by a comparison of the repetition rate of the peaks. Thus an increase in the magnitude of capacitor 110 would cause an increase in the time between successive nodes whereby the modified input signal represented by trace 116 may be made substantially similar to the response trace 80. As illustrated in Fig. 6, the repetition rate of the synthesized signal $W_s$ is approximately 1.2 times the repetition rate of the response signal $W_o$.

Fig. 7 illustrates the difference signal, which is the output from comparator 68, when the signal representing the input to the system under test is modified by the insertion of an oscillatory network having a resonant frequency 1.2 times the resonant frequency of the system under test. From the trace 122 of Fig. 7 it can be seen that the periodic variations in the differential signal have a slightly different repetition rate than that shown in Fig. 5 and a smaller amplitude, but the transient effects causing the trace to be disposed substantially above the imaginary axis 124 remain substantially unchanged.

To provide an electrical analog for the transient response of the system under test a second network is provided in the performance synthesizer 52 as shown in Fig. 3. The signal applied to terminals 114 of the network will be a step function voltage modified by the effects of the resonant network 126. This signal is illustrated by trace 116 of Fig. 6. A network consisting of a variable resistor 128 and capacitance 130 are connected in series between the terminals 114. These two components comprise an integrating network which will produce a voltage at terminals 132 representing the time integral of the signal applied at terminals 114. Thus if a step function voltage were applied directly to terminals 114, the voltage appearing at terminals 132 would be exponential in form, the exact shape and decay time of the signal depending upon the magnitudes of resistor 128 and condenser 130. The signal which is produced at terminals 132 when a step function has been applied to terminals 106 is illustrated by the trace 134 of Fig. 8. The response trace 80 is reproduced for purposes of comparison in Fig. 8, as would be true on a dual beam oscilloscope.

As illustrated in Fig. 8, the condenser 110 of oscillatory network 126 has been adjusted so that the natural frequency imparted to the input signal after passing through the performance synthesizer is the same as the natural frequency of the response signal, which indicates the mechanical characteristics of the system under test. Furthermore, resistor 112 of the network 126 has been adjusted so that the damping coefficient of the modified signal is substantially identical to the damping of the harmonic signal present in the response voltage.

A further alteration has been made in the input signal by network 140 so that the trace 134 also contains a decaying transient similar to the transient response of the system under test. The rate of this transient response is determined by the adjustment of resistor 128. As illustrated in Fig. 8, the time constant as determined by resistor 128 is adjusted to approximately .85 of the time constant of the response, thus leaving a transient effect in the different signal as indicated by single trace 136 of Fig. 9. Furthermore, it will be noted from the trace 136 that a periodic signal is also present in the difference between the modified input signal and the response signal. This is true even though the repetition rate of the response signal is identical to the period of the resonant network 126. It has been found that this apparent periodic effect is the result of the phase shift in these signals caused by the interrelationship of the various transient and periodic responses. To correct for this phase shift the playback head 38 should be adjusted as described with respect to Fig. 2 to produce relative phase shift in the two signals and thus align the nodes thereof whereby a trace is produced on the single beam oscilloscope 128 similar to the trace 138 of Fig. 9. As shown in trace 138, the periodic signal has been completely eliminated, and there remains only a small transient difference resulting from the improper adjustment of resistor 128 in the transient network 140.

Figs. 10 and 11 illustrate another necessary adjustment of the performance synthesizer 52. Therein the response trace 80 is shown in the same form as in the above-described figures, and the input signal has been modified to produce a trace 142 having a repetition rate approximately 1.2 times the repetition rate of the response signal and a transient time constant approximately .6 times the time constant of the response signal. Furthermore, an additional circuit 144 is provided in the performance synthesizer 52 to eliminate steady-state differences in the end portion or tail 146 of the input signal as compared with the tail 148 of the response signal. The alignment of these tails is accomplished by the adjustment of potentiometer 150 which is connected in the grid circuit of a vacuum tube amplifier including triode 152. Tube 152 will be connected in a conventional manner having a cathode resistor 154 for grid bias and plate resistor 156. The output from amplifier 144 will be taken between terminals 158 and will be substantially the same as the signal present at terminals 132 but amplified to simulate the gain of the system under test and thus eliminate steady-state differences between the input and response traces. Thus improper amplification of the input signal will cause a step in the single difference trace as illustrated in trace 160 of Fig. 11, while proper adjustment of the amplifier 154 will produce a trace 162 wherein both ends thereof will be aligned along a common line. In all of the examples other than trace 160 the compensation for system gain has already been inserted.

Proper adjustment of the performance synthesizer is illustrated in Figs. 12 and 13. Therein it can be seen that the response trace 80 is identical to the response trace illustrated above and contains an illustrative transfer function having both an exponential and harmonic characteristic. The input trace 164 has been altered by passage through the performance synthesizer whereby the original step function input now contains a transient response having a time constant substantially identical to the time constant of the system under test and a harmonic response having a period and damping ratio substantially equal to that of the system under test. Though the performance synthesizer has provided substantially all of the variables inserted by the system under test, the difference trace between the two signals may appear as illustrated by trace 166 of Fig. 13. The apparent difference in frequency illustrated by trace 166 is a result of the phase shift of the harmonic response caused by the associated transient response. As described with respect to Fig. 2, this phase shift may be compensated by adjustment of the relative position of the two playback heads in the playback device 28. Upon appropriate adjustment of the heads during determination of the harmonic or periodic response the trace will appear as a substantially pure transient similar to trace 138 of Fig. 9. However, upon proper adjustment of the decay network, the transient and periodic response will be substantially synthesized, producing equal phase shift in both the input and response channels. Consequently a difference signal as indicated by trace 166 in Fig. 13 is produced on the single beam oscilloscope which results from the phase shift manually introduced during the original adjustment of the periodic response. The movable head 38 is now adjusted to approximately its original position, i.e., the position relative to the fixed head 36 assumed by head 38 during the recording of the original signals, whereby all of the characteristics of the system under test are reproduced in the synthesizer and the phase shifts in both channels are substantially the same. The difference will then be substantially zero and the trace 168, approaching a straight line, will appear on the single beam scope. The single beam oscilloscope energized from the output of the comparator as described with respect to Fig. 1 gives the most accurate indication of congruency between the response signal and the altered input signal. The performance synthesizer may be very accurately adjusted to simulate the response of the system under test by accurately adjusting the synthesizer to produce a straight line on the single beam oscilloscope.

Figs. 14 and 15 illustrate another possible condition of the performance synthesizer in which it is not a perfect analog of the response of the system under test. The trace 80 representing the response of the system to a step input is again reproduced in Fig. 14 along with an input trace 170 taken at the output of the performance synthesizer in which the input is a step function altered by passage through networks adapted to produce a harmonic and transient characteristic in the signal. In the adjustment illustrated in Fig. 14 the time constant of the transient network has been properly adjusted to substantially equal the time constant of the system under test, but the natural frequency of the resonant network is somewhat less than the natural frequency of the system under test. The gain of the synthesizer has been adjusted to equal the gain of the system, and therefore the difference trace illustrated in Fig. 15 is a substantially colinear display having undulations in the central portion thereof symmetrically disposed about the axis of the trace indicating agreement between the transient of the system under test and the performance synthesizer. The repetition rate or frequency of the undulations observed in the difference trace 172 will indicate the difference between the harmonic response of the system under test and the natural frequency of the resonant network contained within the performance synthesizer.

Most systems utilized for control will contain resilient elements which will produce a transfer function within the system containing primarily an exponential and a harmonic characteristic. Thus most systems may be analyzed with satisfactory thoroughness by the use of a single network similar to the network 52 of Fig. 3 whereby the harmonic and transient characteristics and gain of a mechanical system under test may be produced in analog. Some systems may exhibit a plurality of resonant frequencies, especially when the system is composed of several substantially independent drives serially connected. In that event it will be desirable to provide additional resonant networks similar to the network 126 of the performance synthesizer whereby the various natural frequencies of the system under test may be reproduced. As various elements of the transfer function or the input function are identified they may be removed from consideration by the insertion of appropriate filters 50 and 60. Thus simplified traces will be applied to the scope, facilitating analysis and transfer function synthesis.

Upon appropriate adjustment of the performance synthesizer 52 whereby two identical traces are produced on the dual beam oscilloscope 26 and a substantially straight line is produced on the single beam oscilloscope 78, the equation of the transfer function of the system under test may readily be written in either operational or harmonic form. A simple example of the manner in which this may be done will now be considered. For simplicity in this explanation it will be assumed that a step function is applied to the input of the system under test and the system has a simple transient response. Therefore, in Laplacian form the input function $I_0$ will be represented as $A/S$ where $A$ is the amplitude of the input step function and $S$ is a complex variable comprising the Laplacian operator. The transfer function of the system having a simple transient response will be $$Y_o = \frac{K_o}{S + \frac{1}{T_o}}$$

where $K_o$ = the gain of the system under test and
$T_o$ = the time constant of the system.

The response function of such a system to such a step input would then be the product of these two functions and would be represented as follows:

$$R_o = Y_o I_o = \frac{K_o A}{S\left(S + \frac{1}{T_o}\right)}$$

If this operational equation is desired as a function of time, an inverse Laplacian transformation may be performed to produce the equation $$R_o = AK_o\left(1 - e^{-\frac{t}{T_o}}\right)$$

From inspecting the oscilloscope pattern it will be obvious that the predominant component is an exponential function. Thus the first step in adjusting the performance synthesizer is to insert a network producing an exponential response when a step function is applied at its input. The output of the synthesizer will then be represented by the equation $$R_s = AK_s\left(1 - e^{-\frac{t}{T_s}}\right)$$

where $K_s$ = the gain of the synthesizer and
$T_s$ = the RC time constant of the transient network.

A comparison of the output of the synthesizer and the response signal will produce a trace on the single beam oscilloscope representative of the difference signal between these two inputs and will have the equation $$D_{(t)} = R_o - R_s = A(K_o - K_s) + AK_s e^{-\frac{t}{T_s}} - AK_o e^{-\frac{t}{T_o}}$$

A steady-state difference between the beginning and end of the single beam trace will represent a difference in gain between the system under test and the synthesizer. This will be represented by the function $A(K_o - K_s)$ which may be adjusted to zero by appropriate adjustment of the potentiometer 150 in the amplifier 144 of the synthesizer. The difference signal will then be represented by the equation $$D_{(t)} = AK_o\left(e^{-\frac{t}{T_s}} - e^{-\frac{t}{T_o}}\right)$$

From this equation it is apparent that if the time constant of the synthesizer is greater than the time constant of the system under test, the difference signal during the transient period will have a positive value, thus giving a rise above the normal trace line on the single beam oscilloscope. Similarly, if the time constant of the synthesizer is less than that of the system under test the trace will exhibit a dip below the desired linear single trace.

Thus in analyzing a simple system having substantially a pure transient response, the steps to be followed in adjusting a synthesizer to produce an analog of the transfer function of the system under test are as follows: First, set the gain of the synthesizer to reduce the tail of the difference signal to align with the initial portion of the trace; second, adjust the time constant of the transient network, such as network 140 of Fig. 3, to substantially reduce the dip or rise in the central portion of the single trace whereby it aligns with the remainder thereof.

If a more complex transfer function is being analyzed, a similar procedure is followed. For example, if a second order transfer function, that is, a transfer function having a harmonic characteristic, is observed, the steps for adjustment of the performance synthesizer would be as follows: First, adjust the gain of the performance synthesizer to reduce the tail of the difference trace to zero; second, through observation of the response wave form on the dual beam oscilloscope, adjust the damping resistor 112 and variable condenser 110 of the resonant network 126 of Fig. 3 until the wave forms on the dual beam oscilloscope appear to be identical; third, readjust the damping resistor 112 and variable condenser 110 while observing the difference trace on the single beam oscilloscope for a more accurate determination of these magnitudes.

The series of adjustments necessary for the analysis of a system having both harmonic and transient response has been sufficiently described throughout this specification. In recapitulation the procedure is as follows: Adjust the static gain of the synthesizer by aligning the tail of the single difference trace with the initial portion thereof. In the network of Fig. 3 this is accomplished by manipulation of potentiometer 150. Since the response function contains a predominant sinusoidal factor, adjust capacitance 110 to determine $W_s$, the natural frequency of the network, and adjust resistor 112 which controls "c," the damping ratio, to cause the output of the synthesizer to approximate $R_o$, the response signal. An adjustment of the phase shift will be necessary at this time to eliminate the periodic signal from the difference trace as described above. This mechanical phase shift will be readjusted later as the transient response is inserted in the synthesizer. The next operation is the adjustment of the exponential time lag, as by the manipulation of resistor 128 in Fig. 3, to reproduce the transient response of the system under test. The last step in the analysis of the system is to readjust all of the components, as there is a certain degree of interrelationship therebetween. It is believed clear that an equation may readily be written for any of these response characteristics or transfer functions as the time constant of a transient network will always bear a known relationship to the circuit elements of the network, and the frequency and damping ratio of a resonant circuit will bear a fixed relationship to the inductance, capacitance, and resistance incorporated therein. These equations may be written in either factored operational form, one a frequency basis, or as a function of time.

While simple networks have herein been shown comprising the synthesizer, it is believed clear that various substitutions may be made therefor which may result in more accurate analysis with fewer adjustments or variables to consider. For example, operational amplifiers may be utilized to synthesize desired impedances by the use of input and feedback networks, as described in my article, "Analog Computers for Servo Problems," in The Review of Scientific Instruments of February, 1950.

Furthermore, while a magnetic tape has here been employed to reproduce the input and response functions, it is believed clear that a transparent film having impressions thereon may be sensed by a photocell system, or any other system for producing a permanent record may be employed. Also, though a step function is employed herein for illustrative purposes, one of the important features of this invention is the analysis of system response to any arbitrary input, customarily one taken under actual operating conditions.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. Analyzing apparatus for use in determining the transfer function characteristics of a system when said system is energized with an arbitrary input comprising recording means for producing a record of the response of such a system to said input during a predetermined time interval, recording means for producing a record of such input during such interval, means for reproducing signals corresponding to said records at a determinable rate and in a determinable phase relationship, synthesizer means for altering the reproduced input record signal from said reproducing means, and means for comparing the response record signal from said reproducing means with the altered input record signal.

2. Analyzing apparatus for use in determining the transfer function characteristics of a system when said system is energized with an arbitrary input comprising recording means for producing a record of the response of such a system to said input during a predetermined time interval, recording means for producing a record of such input during such interval, means for reproducing signals corresponding to said input record and said response record at a determinable rate and in a determinable phase relationship, filter means for eliminating predetermined periodic and exponential functions from said reproduced signals, synthesizer means for introducing exponential and damped periodic effects in the input record signal from said filter means, and means for comparing the response record signal from said filter means with the output of said synthesizer.

3. An analyzer for determining the transfer function characteristics of a system when said system is energized with an arbitrary input comprising recording means for producing a record of the response of such a system to said input during a predetermined time interval, recording means for producing a record of such input during such interval, means for reproducing signals corresponding to said input record and said response record at a predeterminable rate, means for adjusting the phase relationship of said reproduced input record signal and said reproduced response record signal, filter means for eliminating predetermined periodic and exponential functions from said reproduced record signals, synthesizer means for introducing exponential and damped periodic effects in the reproduced filtered input record signal to simulate similar effects in the reproduced filtered response signal, and means for comparing the reproduced filtered response signal with the output of said synthesizer.

4. An analyzer for determining the transfer function characteristics of a system when said system is energized with an arbitrary input comprising means for coincidently and periodically reproducing signals respectively corresponding to an input to said system and to the response of said system to input producing the response, means for adjusting the phase relationship of said reproduced signals, synthesizer means for introducing exponential and damped periodic effects in the reproduced input signal to simulate the reproduced response signal, and means for comparing the reproduced response signal with the output of said synthesizer.

5. A method of determining the transfer function characteristics of a system when energized with an arbitrary input comprising the steps of recording of an input to said system and of the corresponding response of said system, periodically producing signals corresponding to said recordings, comparing the response signal of said system and the input signal, and altering the input signal and noting the alteration thereof to make the input and output signals correspond.

6. A method of determining the transfer function characteristics of a system comprising the steps of periodically reproducing signals representative of an input and the corresponding response of said system, visually comparing the response signal and the input signal of said system, and altering the input signal by effecting known periodic and transient phenomena thereon to cause said altered input signal to correspond to said response signal.

7. A method of determining the relationship between a cause and a resulting effect comprising the steps of making a record on a time base of said cause, making a record on a corresponding time base of said effect, periodically reproducing signals corresponding to said cause and said effect from said records, comparing said signals, and altering the signal corresponding to said cause by producing known transient and periodic phenomena on said cause signal to make the altered signal correspond to said effect signal.

8. A method of determining the relationship between a cause and a resulting effect as set forth in claim 7 wherein said signal altering is done by inserting various electrical networks in series with the reproducing source of said cause signal to produce selected transient and periodic effects on said cause signal whereby the altered signal representing said cause is made to correspond to said effect signal.

9. A method of determining a transfer function expressing the relationship between a cause and a resulting effect comprising the steps of creating a record on a time base of said cause, creating a record on the same time base of said effect, periodically reproducing voltages corresponding to said cause and said effect from said records, comparing instantaneous magnitudes of said voltages to produce a difference voltage therefrom, producing a visual display of said difference voltage on a cathode ray oscilloscope, and altering said cause signal by the insertion of networks producing steady-state, transient, and periodic effects on said cause signal corresponding to the characteristics of said effect signal whereby a linear display is produced on said oscilloscope of the difference voltage reduced to zero.

10. A method of determining a transfer function expressing the relationship between a cause and a resulting effect comprising the steps of creating a record on a time base of said cause, creating a record on the same time base of said effect, periodically reproducing voltages corresponding to said cause and said effect from said records, comparing the instantaneous magnitudes of said voltages to produce a difference voltage therefrom, producing a visual display of said difference voltage on a cathode ray oscilloscope, altering said cause signal by the insertion of networks producing steady-state, transient, and periodic effects on said cause signal to provide a zero difference voltage display on said oscilloscope, and inserting the values of the components of said networks in an expression for the transfer function.

11. A method of determining the transfer function characteristics of a system expressing the relationship between the input thereto and the output therefrom comprising the steps of recording said input and said output in adjacent channels having a common time base, periodically reproducing voltages representing said input and said output, utilizing said voltages to initiate the beam sweep of a cathode ray oscilloscope along one of its coordinates with a periodicity equal to the periodicity of said voltages, deflecting the beam of said oscilloscope from said one of its coordinates corresponding to the magnitude of said voltages, and altering the input voltage by the insertion of electrical networks in series therewith whereby the input and response signal may be made identical and the transfer function of the system synthesized.

12. An analyzer for determining the transfer function characteristics of a system when said system is energized with an arbitrary input comprising means for coincidently reproducing at a predetermined repetition rate signals corresponding respectively to the input to said system and the response of said system thereto, synthesizer means for introducing exponential and damped periodic effects in the reproduced input signal to simulate similar effects in the reproduced response signal, and means for comparing the reproduced response signal with the output of said synthesizer.

13. An analyzer for determining the relationship between a cause and a resulting effect comprising means for coincidently reproducing at a predetermined repetition rate signals corresponding respectively to said cause and to said resulting effect, synthesizer means for introducing known exponential and damped periodic effects in the cause signal to simulate corresponding effects in the effect signal, and means for comparing the effect signal with the output of said synthesizer.

14. An analyzer for determining the transfer function characteristics of a system when said system is energized with an arbitrary input comprising means for coincidently reproducing in isolated channels with a predetermined periodicity voltages corresponding to the input to said system and the respective response of said system to said input, synthesizer means comprising known electrical networks in the input voltage channel for introducing selected steady-state and transient phenomena in said voltage representing the input, and comparator means for comparing the response signal with the output of said synthesizer.

15. An analyzer for determining the transfer function characteristics of a system when said system is energized with an arbitrary input comprising means for coincidently reproducing in isolated channels with a predetermined periodicity voltages corresponding to the input to said system and the response of said system, synthesizer means energized by the voltage representing said input comprising networks connected seriatim to introduce into said input voltage selected steady-state, transient, and periodic characteristics to simulate various effects in the response voltage, a difference network energized by said response voltage and the output of said synthesizer to provide a voltage proportional to the instantaneous difference therebetween, and indicating means energized from said difference network for determining the congruency of said response voltage and the output of said synthesizer.

16. An analyzer for determining the transfer function characteristics of a system when said system is energized with an arbitrary input comprising means for coincidently reproducing in isolated channels with a predetermined periodicity voltages corresponding to the input to said system and the response of said system to the input, synthesizer means energized by the voltage representing said input comprising networks connected seriatim to introduce into said input voltage selected steady-state, transient, and periodic effects to simulate corresponding effects in the response voltage, a difference network energized by said response voltage and the output of said synthesizer to generate a voltage proportional to the instantaneous difference therebetween, cathode ray oscilloscope means having a beam source and a sweep circuit for moving the beam from said source along one coordinate, said sweep circuit being synchronized to repeat for each repetition of said input voltage and responsive to the output of said difference network for producing beam deflection transverse to said one coordinate, and second oscilloscope means having two beam sources and sweep circuitry therefor for deflecting beams from said beam sources along one coordinate, said sweep circuitry being synchronized to repeat for each repetition of said input and for deflecting one of said beams in accordance with the output of said synthesizer and the other of said beams in accordance with said response voltage.

References Cited in the file of this patent

UNITED STATES PATENTS

| | | |
|---|---|---|
| 2,006,698 | Peterson | July 2, 1935 |
| 2,143,094 | Swift | Jan. 10, 1939 |
| 2,213,099 | Adorjan | Aug. 27, 1940 |
| 2,378,383 | Arndt | June 19, 1945 |
| 2,416,353 | Shipman | Feb. 25, 1947 |
| 2,432,214 | Sontheimer | Dec. 9, 1947 |
| 2,443,603 | Crost | June 22, 1948 |
| 2,646,545 | King | July 21, 1953 |
| 2,650,345 | Lozes Jr. | Aug. 25, 1953 |

OTHER REFERENCES

Publication, "The Brush Transient Analyzer," 1 p., received October 1, 1943.

"Harmonic Synthesizer for Demonstrating and Studying Complex Wave Forms," article in Journal of Scientific Instruments, October, 1944, pp. 174–77.

"Transient Response Equalization Through Steady State Methods," article in Proceedings of the I.R.E., vol. 37, M. 4, April 1949, pp. 447–450.